UNITED STATES PATENT OFFICE.

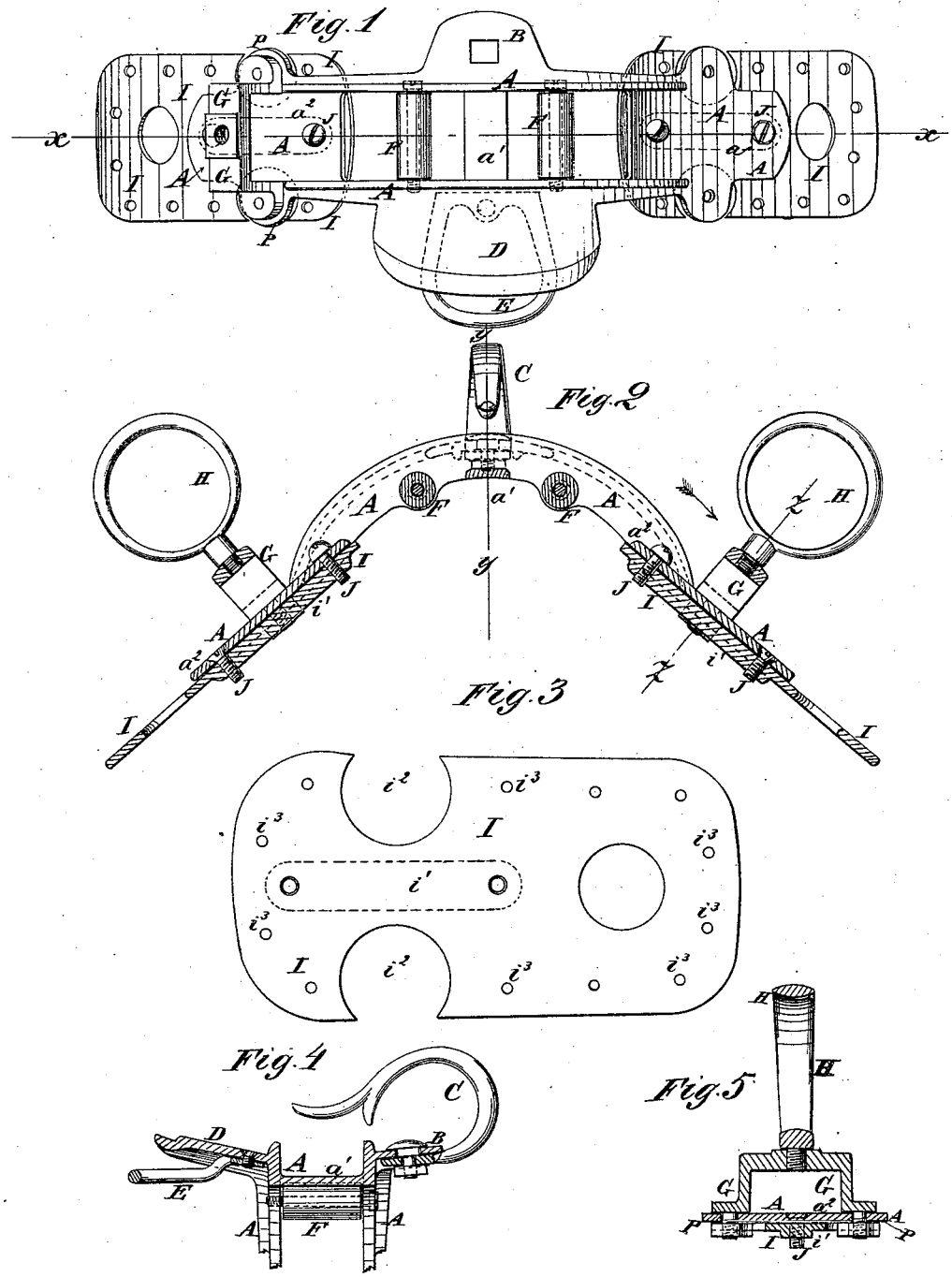

SAMUEL E. TOMPKINS, OF SING SING, NEW YORK.

IMPROVEMENT IN HARNESS-SADDLES.

Specification forming part of Letters Patent No. 186,772, dated January 30, 1877; application filed December 4, 1876.

*To all whom it may concern:*

Be it known that I, SAMUEL E. TOMPKINS, of Sing Sing, in the county of Westchester and State of New York, have invented a new and useful Improvement in Harness-Saddles, of which the following is a specification:

The object of this invention is to furnish harness-saddles which shall be so constructed that the jockey-flap and pad parts may be made and attached to the bearing-plates, and the saddle-tree afterward attached to said bearing-plates, so that the saddle-tree need not be soiled or marred by handling in making the saddle, as is usually the case.

The invention will first be described in connection with the drawing, and then pointed out in the claims.

Figure 1 is a top view of the saddle-tree and bearing-plates. Fig. 2 is a vertical longitudinal section of the same, taken through the line $x\,x$, Fig. 1. Fig. 3 is a detail top view of one of the bearing-plates. Fig. 4 is a cross-section of the saddle-tree, taken through the line $y\,y$, Fig. 2. Fig. 5 is a detail cross-section taken through the line $z\,z$, Fig. 2.

Similar letters of reference indicate corresponding parts.

A represents the saddle-tree, which is formed of two arched bars, connected at the lower edge of their centers by a cross-bar, $a^1$, and at their ends by two small plates, $a^2$, said plates having ears P on each side, with holes to receive the terret-bar shanks or their equivalents. The arched bars of the saddle-tree A have flanges formed on their outer sides, which can be made wider or narrower, as the strength and beauty of the tree may demand, as the trees are made larger or smaller. To and between the bars, near their lower edges, and upon the opposite sides of the cross-bar $a^1$, are pivoted two rollers, F, by means of screws or rivets. The upward projection of the bars of the saddle-tree form a channel to receive the back-band, and allow it to slide back and forth, as one or the other of its ends are drawn upon.

If desired, the rollers F may be omitted, and replaced by bars, to receive and support the back-band; or the bar $a^1$ and plates $a^2$ may be widened into one continuous plate.

Upon the forward arched bar of the saddle-tree A is formed the front cantle B, through which is formed a square hole to receive the bolt that secures the water-hook C. Upon the rear arched bar of the saddle-tree A is formed the rear cantle D, to which is secured the crupper-loop E. The crupper-loop E is made in U shape, with its arms drawn toward each other a little, and connected by a cross-bar, the whole being formed in one solid piece. The middle part of the bar of the loop E is widened, to strengthen it where weakened by forming the hole for the screw or rivet. The crupper-loop E is made with a slight downward offset in its arms, as shown in Fig. 4, to give space between it and the cantle D to receive the turn-back strap, which secures the crupper-dock.

Upon the middle part of the side edges of the plates $a^2$ are formed circular projections, ears, or lugs P, through which are formed holes to receive the screws or rivets by which the terret-bars G are secured in place. The arms of the terret-bars G are bent downward at right angles, and their ends are bent outward at right angles, and have holes formed through them to receive the screws or rivets by which the said bar is secured to the ears or lugs P of the plates $a^2$; or the said screws or rivets may be cast upon the ends of said terret-bar, as is the case in the accompanying drawings. In the center of the bar G is formed a screw-hole, into which the terret H is screwed. The arch of the terret-bar G thus forms a space through which the back-band can pass freely.

I I are the under or bearing plates, which are secured to the under side of the plates $a^2$ by the screws J. The part of the plate I through which the screws J pass is strengthened by a rib, $i^1$, formed upon its lower side. In the side parts of the plate I are formed recesses $i^2$, to receive the nuts of the screws that secure the bar G to the plate $a^2$. In the plate I are formed holes, for securing the flaps and pad to the said plate.

By this construction the pad and flaps, with all that appertains thereto, can be formed and secured to the plates I, and the plates I, with the attached pad parts, can then be secured to the plates $a^2$ of the saddle-tree A. This construction protects the saddle-tree A from any danger of being soiled or marred by the workman while the pad and flap parts are being made and secured to the bearing-plates I, and enables the bearing-plates and pad to be detached without interfering with the said saddle-tree and terrets, and enables the pad parts to be made with a sewing-machine, as they are free from any interference from the tree, thus greatly lessening the labor.

Having thus described my invention, I claim as new and desire to secure by Letters Patent—

1. The saddle-tree formed of the arched bars A, connected by the cross-bars $a^1$, and the plates $a^2$, provided with ears or lugs P, to which are attached the terret-bar shanks.

2. The bearing-plates I, provided with the strengthening-ribs $i^1$, the recesses $i^2$, and the holes $i^3$, and secured detachably to the plates $a^2$ of the saddle-tree A by the screws J, substantially as herein shown and described.

3. The arched bars A, containing flanged edges, to give strength and solidity, while enabling the bars A to be cast or made lighter.

4. The arched bars A, extending across the saddle on each side, from terret-bar to terret-bar, in combination with detachable under pieces and elevated terret-bars, substantially as described.

5. The arched bars A, substantially as described, containing the front cantle B and the back cantle D, substantially as described.

6. The extension-plates $a^2$, having ears or lugs to receive the fastenings of the terret-bars G, and holes to receive the screws J J, that secure the under plates I to the frame A, substantially as described.

7. The detachable under pieces I, having no connection with the terrets or terret-bars, removed or secured by means of screws J, or their equivalents, independent of the terrets or terret-bars.

8. The combination of the arched bars A, the front cantle B, to secure the hook C, the back cantle D, crupper-loop E, the cross-bars $a^1$, the plates $a^2$, the ears or lugs P, the terret-bars G, the terrets H, the under pieces I, the friction-rollers F, and the screws J, substantially as herein shown and described.

SAML. E. TOMPKINS.

Witnesses:
 JAMES T. GRAHAM,
 C. SEDGWICK.